A. BERNWALL AND A. PULKKA.
ADJUSTABLE BALL BEARING.
APPLICATION FILED APR. 28, 1919.
1,324,026. Patented Dec. 9, 1919.
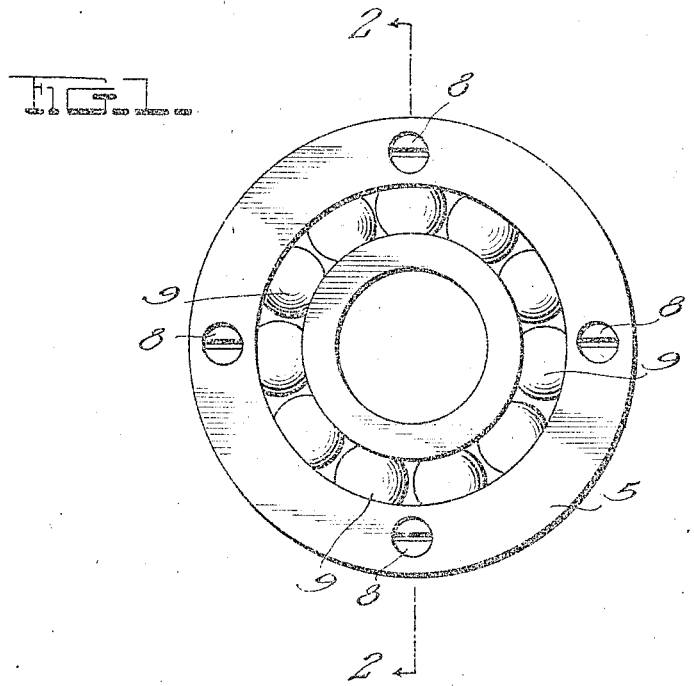
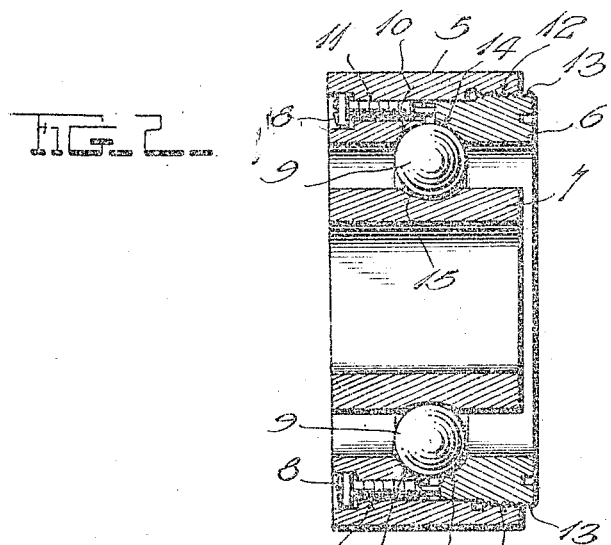
Inventors
A. BERNWALL,
AND A. PULKKA,

# UNITED STATES PATENT OFFICE.

ARTHUR BERNWALL AND AKSEL PULKKA, OF CHICAGO, ILLINOIS.

ADJUSTABLE BALL-BEARING.

1,324,026.　　　　　Specification of Letters Patent.　　Patented Dec. 9, 1919.

Application filed April 28, 1919. Serial No. 293,085.

*To all whom it may concern:*

Be it known that we, ARTHUR BERNWALL, a subject of the King of Sweden, residing at Chicago, in the county of Cook and State of Illinois, and AKSEL PULKKA, a subject of Finland, residing at Chicago, in the county of Cook and State of Illinois, have invented certain new and useful Improvements in Adjustable Ball-Bearings; and we do declare the following to be a full, clear, and exact description of the invention, such as will enable others skilled in the art to which it appertains to make and use the same.

This invention relates to ball bearings and it relates more specifically to an improved adjustable ball bearing.

One object of this invention is to provide an exceedingly effective construction in which the ball-races may be very accurately adjusted without danger of adjusting them too tightly, and in which the ball-races are securely held in adjustment by the means which limits their movement during adjustment.

Other objects and advantages may become apparent to persons who read the following details of description in connection with the accompanying drawings in which:

Figure 1 is an elevation illustrating our improved ball bearing.

Fig. 2 is a central section along the axis of the ball races, as indicated by the line 2—2 of Fig. 1.

Referring to these drawings in detail in which similar reference characters correspond with similar parts throughout the several views, the device consists of a main ring or outer race member 5, an intermediary or subsidiary ring 6, an inner ring or race member 7, a plurality of set screws 8, and a plurality of bearing balls 9.

The main ring 5 is formed with a ball race 10, a screw-threaded aperture 11 and an internal screw-thread 12. The ring 6 is formed with external screw-threads 13 and with a bearing race 14. The inner member 7 is formed with a bearing race 15, and this member may be hollow, as indicated, or of any appropriate construction.

From the foregoing description of the construction, it will be seen that the ring 6 can only be screwed inward to the extent permitted by the position of the set screws 11. Therefore, when the ball bearing is in operation, it is impossible for the races to become shifted in such relation as to bind against the balls. However, when the races have become worn, so that it is necessary to move the ball race 14 inward toward the ball race 10, the screws 8 may be loosened, so that the ring 6 may be screwed inward to the desired adjusted position, whereupon the screws 8 may be tightened so that their inner ends bind against the inner plane surface of the member 6, so that any excessive pressure of the ring 6 against the balls is relieved, and at the same time, the ring 6 is frictionally locked in its seat.

From the foregoing description it will be seen that we have provided a ball bearing which is very compact, consists of a very few parts, and that the device is very practical and comparatively inexpensive.

Although we have described this embodiment of our invention very specifically, it is not intended to limit this invention to these exact details of construction and arrangement of parts, but we are entitled to make appropriate changes within the scope of the inventive idea disclosed in the foregoing description and following claims.

What we claim as our invention is:

1. In a ball bearing, an internally threaded ring formed with a ball-race and with an aperture between said ball-race and the periphery of the ring, an externally threaded ring formed with a ball race and having its threads engaged with those of the internally threaded ring, a screw in said aperture and being normally in contact with said externally threaded ring and operatable to control adjustment of the latter, and a ball-race member having its ball-race in position to coact with the ball races of said rings for carrying bearing-balls.

2. In a ball bearing, an internally threaded ring formed with a ball-race and with a screw-threaded aperture extending between the ball race and the periphery of the ring in an axially parallel relation, an externally threaded ring having its threads engaged with those of the internally threaded ring, a set-screw longitudinally adjustable in said aperture and normally abutting against said externally threaded ring, a ball-race member having its ball-race associated with the ball races of said externally threaded ring and internally threaded ring, and balls carried by said ball races.

In testimony whereof we have hereunto set our hands.

ARTHUR BERNWALL.
AKSEL PULKKA.